United States Patent Office 3,555,048
Patented Jan. 12, 1971

3,555,048
HYDROXYMETHYLTETRAHYDROPYRAN PRODUCTION
Paul R. Stapp and James D. Allen, Bartlesville, Okla., assignors to Phillips Petroleum Company, a corporation of Delaware
No Drawing. Filed Nov. 15, 1967, Ser. No. 683,153
Int. Cl. C07d 7/04
U.S. Cl. 260—345.9                                    3 Claims

ABSTRACT OF THE DISCLOSURE

Production of 2-hydroxymethyltetrahydropyrans and 3-hydroxymethyltetrahydropyrans in high yields is effected by hydroformylation of 3,6-dihydro-2-[H]-pyrans in the presence of CO, hydrogen, and an oxo catalyst.

BACKGROUND OF THE INVENTION

This invention relates to an improved process for producing 2-hydroxymethyltetrahydropyrans and 3-hydroxymethyltetrahydropyrans by hydroformylation. In accordance with another aspect, this invention relates to a process for converting a 3,6-dihydro-2-[H]-pyran to a high yield of a mixture of a 2-hydroxymethyltetrahydropyran and a 3-hydroxymethyltetrahydropyran by contacting with CO and $H_2$ in the presence of an oxo catalyst.

Hydroxymethyltetrahydropyrans are useful compounds. For example, Francis and Rudloff, Can. J. Chem., volume 37, pages 972–978 (1959), disclose that 2-hydroxymethyltetrahydropyran can be converted to 1,3,6-hexanetriol and 1,2,6-hexanetriol. U.S. Pat. 2,768,213 discloses that hexanetriols can be employed for many purposes in lieu of glycerine. Particularly, U.S. Pat. 2,768,213 discloses that 1,2,6-hexanetriol can be converted to $C_5$–$C_{15}$ monocarboxylic esters, which are improved plasticizers for the resinous polymers of polymerizable ethylenic compounds, for example, polyvinyl chloride. Example V of that patent discloses that such esters, particularly the tricaprylate of 1,2,6-hexanetriol, impart unusually good low temperature characteristics to polyvinyl chloride resins. Of course, the products of the instant invention are believed useful for a variety of applications such as solvents, chemical intermediates, polymer precursors, and the like.

The production of 2-hydroxymethyltetrahydropyran by the process of the instant invention constitutes a totally unexpected result and an advance in the art. Falbe and Korte (Chemical Abstracts, volume 61, page 634 [1964]) disclose that 2,3-dihydro-4-[H]-pyran (5,6-dihydro-4-[H]-pyran), CO, and $H_2$ can be converted to a mixture comprised of 2-hydroxymethyltetrahydropyran and 3-hydroxymethyltetrahydropyran in the presence of an oxo catalyst (cobalt carbonyl). That reaction might be predicted by one skilled in the hydroformylation art since hydrogen is added to one carbon of the double bond and hydroxymethyl is added to the other carbon of the double bond. The conversion of the instant invention is totally unexpected, however; instead of a product comprised of 3-hydroxymethyltetrahydropyran and 4-hydroxymethyltetrahydropyran, a high yield of 2-hydroxymethyltetrahydropyran was obtained. This was a surprising result.

Accordingly, an object of this invention is to provide an improved process for the hydroformylation of 3,6-dihydro-2-[H]-pyrans.

Another object of this invention is to provide a process for producing hydroxymethyltetrahydropyrans, wherein high yields and substantially complete conversions are obtained.

Other aspects, objects, as well as the several advantages of this invention will be apparent to those skilled in the art upon reading the specification and the appended claims.

SUMMARY OF THE INVENTION

In accordance with the invention, 3,6-dihydro-2-[H]-pyrans are hydroformylated, with CO and $H_2$ in the presence of an oxo catalyst, to 2-hydroxymethyltetrahydropyrans and 3-hydroxymethyltetrahydropyrans.

More specifically, according to the invention, 3,6-dihydro-2-[H]-pyran, CO, and $H_2$ are converted in the presence of cobalt carbonyl to a high yield of 2-hydroxymethyltetrahydropyran and 3-hydroxymethyltetrahydropyran, which are precursors to valuable hexanetriols that can be converted to esters useful as plasticizers.

PREFERRED EMBODIMENTS OF THE INVENTION

The reactant dihydropyran that can be used in this invention has the formula

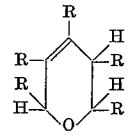

wherein R can be hydrogen and where one and only one R group per molecule can be alkyl, cycloalkyl, or combinations thereof, and can contain to and including about 17 carbon atoms per R group.

Representative examples of 3-6-dihydro-2-[H]-pyrans that can be employed having the formula noted above include 3,6-dihydro-2-[H]-pyran, 2-methyl-3,6-dihydro-2-[H]-pyran, 3-heptadecyl-3,6-dihydro-2-[H]-pyran, 4-octyl-3,6-dihydro-2-[H]-pyran, 5-cyclohexyl-3,6-dihydro-2-[H]-pyran, 6-propyl-3,6-dihydro-2-[H]-pyran, 2-cyclododecyl-3,6-dihydro-2-[H]-pyran, 3-(3-cyclohexyl-4-ethyl-5-methyloctyl)-3,6-dihydro-2-[H]-pyran, 2-[4-(2-ethyl-3-methylcyclopentyl)heptyl]-3,6-dihydro-2-[H]-pyran, 2-(1-methyl-2-propyl-4-ethyldecyl)-3,6-dihydro-2-[H]-pyran, and the like.

The hydroxymethyltetrahydropyrans produced from the dihydropyrans noted above have the formulas:

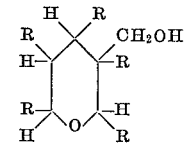

and

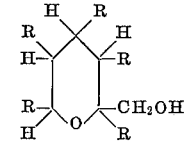

wherein R can be hydrogen and where one and only one R group per molecule can be alkyl, cycloalkyl, or combinations thereof, and can contain to and including about 17 carbon atoms per R group.

Illustrative and representative hydroxymethyltetrahydropyrans produced according to the invention having the above formula include: 2-hydroxymethyltetrahydropyran, 3-hydroxymethyltetrahydropyran, 3-hydroxymethyl-2-methyltetrahydropyran, 2-hydroxymethyl-3-heptadecyltetrahydropyran, 3-hydroxymethyl-3-heptadecyltetrahydropyran, 3-hydroxymethyl-5-cyclohexyltetrahydropyran, 2-hydroxymethyl-5-cyclohexyltetrahydropyran, 3-hydroxymethyl-2-[4-(2-ethyl-3-methylcyclopentyl)heptyl]tetrahydropyran, 3-hydroxymethyl-2-

(1-methyl-2-propyl-4-ethyldecyl)tetrahydropyran, and the like.

The conversion, in accordance with the invention, is represented by the following:

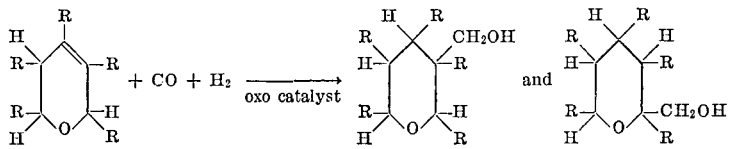

wherein R is defined above.

The above hydroformylation reaction can be effected at pressures in the range of about 500 p.s.i.g. to about 10,000 p.s.i.g., preferably in the range of about 2,000 p.s.i.g. to about 3,000 p.s.i.g. Temperatures in the range of about 250° F. to about 500° F. can be employed, temperatures in the range of about 350° F. to about 400° F. are preferred. Sufficient reaction time should be employed to effect the degree of conversion desired, normally we prefer to employ reaction times of in the range of about 5 minutes to about 12 hours, more preferably reaction times in the range of about 1 to about 4 hours.

Carbon monoxide should be employed in a quantity at least molarly equivalent initially to the 3,6-dihydro-2-[H]-pyran charged. Molar excesses of carbon monoxide are preferred. For example, the molar ratio of 3,6-dihydro-2-[H]-pyran compound/carbon monoxide can range from about 0.05 to about 1.0, the preferred ratio is in the range of about 0.1 to about 0.5. The molar ratio of carbon monoxide/hydrogen can be in the range of about 0.5 to about 2. In general, however, molar ratios of carbon monoxide/hydrogen should be about 1.

A suitable hydroformylation catalyst (oxo catalyst) should be employed, which can be any conventional hydroformylation catalyst. Examples can include $Co_2(CO)_8$, rhodium oxide, palladium oxide, iridium oxide, ruthenium oxide, palladium chloride, and the like. Such catalysts should be employed in quantities sufficient to effect the hydroformylation conversion within the times desired. Such catalysts are generally employed in the range of about 0.001 to about 0.15 part of catalyst per part of 3,6-dihydro-2-[H]-pyran compound charged.

Suitable diluents are also preferably employed. A suitable diluent is any material normally liquid under the reaction environment which is employed that does not deleteriously affect the said hydroformylation conversion. Such diluents can be either polar or nonpolar. Examples include pentane, hexane, cyclohexane, benzene, naphthalene, dodecane, octane, decane, xylene, toluene, acetone, methyl ethyl ketone, ethanol, 2-propanol, tetrahydropyran, tetrahydrofuran, methyl isobutyl ketone, ethyl ether, isopropyl ether, n-butanol, n-hexanol, and the like. If alcohols are employed as diluents, higher temperatures, within the range disclosed, and longer reaction times, within the range disclosed, should preferably be employed. Such diluents can be employed in quantities sufficient to comprise in the range of about 1 to about 90 weight percent of the reactor contents.

The hydroxymethyltetrahydropyrans produced by the process of this invention can be recovered by any means known to the art such as crystallization, solvent extraction, and the like.

Conventional equipment and conventional techniques including batch, semicontinuous, and continuous operations can be employed to effect the process of this invention.

SPECIFIC EXAMPLE

To a reactor were charged 17 g. (0.2 mole) of 3,6-dihydro-2-[H]-pyran and 50 ml. of cyclohexane. Synthesis gas ($CO:H_2$, 1:1 ratio) was pressured to 2,200 p.s.i.g. Temperature of the reactor contents was 60° F., and was then raised to 260° F. Five ml. of a mixture comprised of 0.39 g. cobalt carbonyl catalyst and benzene was added. The temperature was raised to 390° F. for a three-hour reaction period. Upon cooling, the product was removed and fractionally distilled to yield 16 g. of a mixture comprised of about 75 mole percent 2-hydroxymethyltetrahydropyran and about 25 mole percent 3-hydroxymethyltetrahydropyran (B.P. 68–97° F. at 8 mm. Hg), as determined by G–LC (gas-liquid chromatography). Yield of hydroxymethyltetrahydropyrans was 70 mole percent, based on the 3,6-dihydro-2-[H]-pyran charged. Conversion of 3,6-dihydro-2-[H]-pyran was determined to be 100 percent.

Infrared spectra of the product were consistent with expected spectra for a mixture of 2-hydroxymethyltetrahydropyran and 3-hydroxymethyltetrahydropyran.

The products of a series of runs, as exemplified by the run above, were combined and purified. Gas-liquid chromatography of the purified product determined it to be comprised of about 25 mole percent 3-hydroxymethyltetrahydropyran and about 75 mole percent 2-hydroxymethyltetrahydropyran (chromatographic column was 5 ft. ¼ in. Carbowax 20 M, only two peaks were observed, no evidence of impurities was observed). The purified sample was characterized by nuclear magnetic resonance analysis, elemental analysis, and molecular weight determination. NMR data were as expected. Molecular weight calculated for hydroxymethyltetrahydropyran is 116, molecular weight found was 116. The material was determined to have 61.7 percent carbon and 10.5 percent hydrogen. Elemental composition calculated for hydroxymethyltetrahydropyran is 62 percent carbon and 10.4 percent hydrogen. The major peak found with G–LC analysis was consistent with the peak formed by an authentic sample of 2-hydroxymethyltetrahydropyran. The minor peak, clearly different from the major peak, was consistent with 3-hydroxymethyltetrahydropyran.

This example clearly demonstrates that the products produced from 3,6-dihydro-2-[H]-pyrans according to the process of this invention are not those which would be predicted by the teachings of the art. The following representations of the chemistry involved more clearly show the unexpected results.

Representation I, conversion of 3,6-dihydro-2-[H]-pyran according to the process of the instant invention:

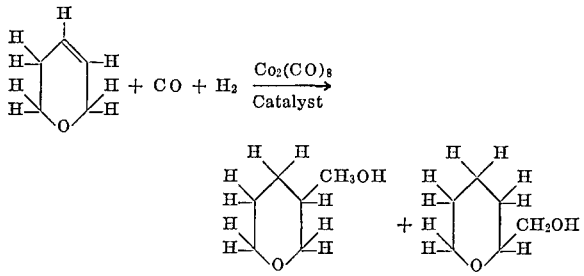

Representation II, conversion of 2,3-dihydro-4-[H]-pyran according to the prior art disclosure:

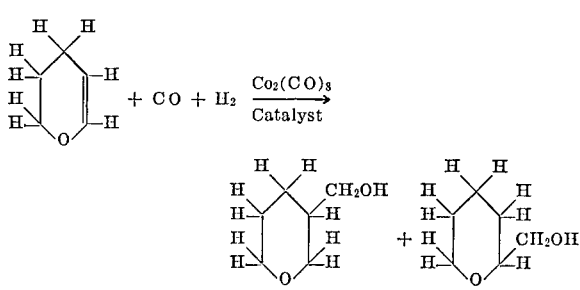

We claim:

1. A process for the production of hydroxymethyl-tetrahydropyrans which comprises reacting 3,6-dihydro-2-[H]-pyran with CO and $H_2$ in the presence of cobalt carbonyl, to produce a mixture of 2-hydroxymethyltetrahydropyran and 3-hydroxymethyltetrahydropyran, said reacting being conducted at a temperature ranging from 250–500° F., an elevated pressure ranging from about 500 p.s.i.g. to about 10,000 p.s.i.g., and for a period of time of 5 minutes to 12 hours.

2. A process according to claim 1 wherein said reacting is conducted at a temperature in the range 350–400° F., at elevated pressure in the range between 2,000–3,000 p.s.i.g., and for a period of time in the range of about 1 to about 4 hours.

3. A process according to claim 1 wherein the reacting is conducted in a reaction diluent.

References Cited

UNITED STATES PATENTS

| | | | |
|---|---|---|---|
| 3,168,575 | 2/1965 | Prosser | 260—614X |
| 3,257,415 | 6/1966 | O'Grady et al. | 260—340.5 |

OTHER REFERENCES

Asinger, F. et al.: Chemische Berichte, vol. 88, No. 3 (1955), pp. 445–451.

Falbe, J. et al.: Chemische Berichte, vol. 97, No. 4 (April 1964), pp. 1104–10.

NORMA S. MILESTONE, Primary Examiner